United States Patent
Arai et al.

(10) Patent No.: US 11,642,834 B2
(45) Date of Patent: May 9, 2023

(54) MANUFACTURING METHOD FOR COLORED PRODUCTS AND INK EJECTION DEVICE

(71) Applicants: MIMAKI ENGINEERING CO., LTD., Nagano (JP); NATIONAL UNIVERSITY CORPORATION CHIBA UNIVERSITY, Chiba (JP)

(72) Inventors: Wataru Arai, Nagano (JP); Kunio Hakkaku, Nagano (JP); Norimichi Tsumura, Chiba (JP); Keita Hirai, Chiba (JP); Junki Yoshii, Chiba (JP)

(73) Assignees: MIMAKI ENGINEERING CO., LTD., Nagano (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 153 days.

(21) Appl. No.: 17/152,732

(22) Filed: Jan. 19, 2021

(65) Prior Publication Data
US 2021/0229341 A1    Jul. 29, 2021

(30) Foreign Application Priority Data

Jan. 28, 2020 (JP) .............................. JP2020-011531

(51) Int. Cl.
| | |
|---|---|
| *B29C 64/112* | (2017.01) |
| *B29C 64/393* | (2017.01) |
| *C09D 11/30* | (2014.01) |
| *B29C 64/40* | (2017.01) |
| *B33Y 10/00* | (2015.01) |
| *B33Y 30/00* | (2015.01) |

(52) U.S. Cl.
CPC .......... *B29C 64/112* (2017.08); *B29C 64/393* (2017.08); *B29C 64/40* (2017.08); *C09D 11/30* (2013.01); *B33Y 10/00* (2014.12); *B33Y 30/00* (2014.12)

(58) Field of Classification Search
CPC ..................................................... B29C 64/112
See application file for complete search history.

(56) References Cited

U.S. PATENT DOCUMENTS

| | | | |
|---|---|---|---|
| 2018/0050488 A1* | 2/2018 | Okawa | B29C 64/393 |
| 2018/0050489 A1* | 2/2018 | Okawa | B29C 64/112 |
| 2018/0111311 A1* | 4/2018 | Ochi | B33Y 30/00 |
| 2018/0178444 A1* | 6/2018 | Hakkaku | B41J 2/01 |

FOREIGN PATENT DOCUMENTS

JP    2015071282    4/2015

* cited by examiner

*Primary Examiner* — Nathan T Leong
(74) *Attorney, Agent, or Firm* — JCIPRNET (57) ABSTRACT

A manufacturing method for manufacturing a colored product, where using inkjet heads which are a plurality of color ink heads, and an inkjet head, which is a colorless ink head, a plurality of coloring regions are formed in an overlapping manner in a normal direction, a surface side colored region, which is a region located closest to the surface of the colored product is formed using at least the color ink ejected from any of the inkjet heads, and an inner colored region, which is a region located farther from the surface of the colored product than the surface side colored region is formed using at least the color ink ejected from any of the inkjet heads and the colorless ink ejected from the inkjet head.

9 Claims, 6 Drawing Sheets

| Object | Inner side | Inner side of surface |
|---|---|---|
| Human skin | Subcutaneous structure (blood vessels, etc.) | Epidermis (+ stains) |
| Corn soup | Liquid (soup) | Corn |
| Water tank | Fish in water | Water surface + aquatic plants |

MANUFACTURING METHOD FOR COLORED PRODUCTS AND INK EJECTION DEVICE

CROSS REFERENCE TO RELATED APPLICATIONS

This application claims the priority benefit of Japanese Patent Application No. 2020-011531, filed on Jan. 28, 2020. The entirety of the above-mentioned patent application is hereby incorporated by reference herein and made a part of this specification.

TECHNICAL FIELD

The present disclosure relates to a manufacturing method for a colored product and an ink ejection device.

DESCRIPTION OF THE BACKGROUND ART

Conventionally, a shaping device (3D printer) for shaping a shaped object using an inkjet head is known (see e.g., Japanese Unexamined Patent Publication No. 2015-071282, Patent Literature 1). In such a shaping device, the shaped object is shaped through a layered shaping method by overlapping a plurality of layers of ink formed by an inkjet head.
Patent Literature 1: Japanese Unexamined Patent Publication No. 2015-071282

When shaping a colored shaped object in a shaping device, it is conceivable to form a light-reflecting region inside the shaped object and form a colored region around such a region. In this case, the colored shaped object can be shaped by forming a colored region on the surface of the shaped object so as to draw an image using color ink for coloring. Furthermore, in recent years, it is desired to shape a shaped object colored with higher quality due to the widespread use of shaping devices and the like. The present disclosure thus provides a manufacturing method for a colored product and an ink ejection device capable of overcoming such problems.

SUMMARY

The inventor of the present application conducted intensive research on a method for shaping a shaped object colored with higher quality. Then, it was considered to overlap a plurality of regions in the normal direction of the surface of the shaped object for the region formed using color ink for coloring. With such a configuration, by coloring each region individually, various designs can be expressed and coloring can be performed with high quality. Furthermore, regarding a case where a plurality of regions is overlapped in such a way, the inventor of the present application further found that it is preferable to use not only color ink but also colorless ink such as clear ink when forming a region (inner colored region), which is the inner side in at least the normal direction. With this configuration, the inner colored region can be formed with a desired thickness (predetermined thickness) with higher accuracy. Moreover, in this case, the shaping of the shaped object can be appropriately performed with higher accuracy by overlapping another region on the outer side of the inner colored region in which the thickness is adjusted with higher accuracy.

In addition, the inventor of the present application found, through further intensive research, that such a coloring method is not limited to being applied when shaping a shaped object but also when printing an image on a medium (media). Furthermore, the inventor of the present application found features necessary for obtaining such effects and contrived the present disclosure.

In order to solve the above problems, the present disclosure provides a manufacturing method for a colored product for manufacturing a colored product which is a product colored using ink, the manufacturing method including: using a plurality of color ink heads which are a plurality of inkjet heads that eject color inks different from each other; using a colorless ink head, which is an inkjet head that ejects colorless ink; forming a plurality of coloring regions in an overlapping manner in a normal direction so that a thickness in the normal direction of a surface of the colored product each becomes a predetermined thickness; forming, among the plurality of coloring regions, a surface side colored region, which is a region located closest to the surface of the colored product in the normal direction using at least the color ink ejected from any of the color ink heads; and forming, among the plurality of coloring regions, an inner colored region, which is a region located farther from the surface of the colored product than the surface side colored region in the normal direction using at least the color ink ejected from any of the color ink heads and the colorless ink ejected from the colorless ink head.

With such a configuration, coloring with high designability can be performed by overlapping the inner colored region and the surface side colored region formed by using the color ink. Thus, the colored product colored with high quality can be appropriately manufactured. Furthermore, in this case, the inner colored region can be more appropriately formed with a predetermined thickness by forming the inner colored region by further using the colorless ink in addition to the color ink. As a result, a plurality of regions can be appropriately formed in an overlapping manner with high accuracy. Therefore, with such a configuration, a colored product colored with high quality can be appropriately manufactured with high accuracy.

Here, regarding the colorless ink, the fact that it is colorless can be considered, that it is not intentionally colored. Furthermore, regarding the fact that the coloring is not intentionally performed, it can be considered that, a coloring material such as a pigment or a dye for coloring is not intentionally added. Moreover, regarding a plurality of regions overlapping in the normal direction of the surface of the colored product, the thickness (predetermined thickness) of each layer may be different for each layer.

Furthermore, in the colored product, for a plurality of coloring regions with color ink, more regions may be overlapped in the normal direction. In this case, at the time of manufacturing the colored product, a plurality of inner colored regions and a surface side colored region are formed so as to be overlapped in the normal direction. Furthermore, in this case, it is conceivable to color each inner colored region in a state different from each other. With such a configuration, more diverse and high-quality coloring can be performed by using more coloring regions. Moreover, in this case, coloring the plurality of inner colored regions in different states means, coloring so that the inner colored regions show different images, coloring with different colors, or the like. Furthermore, when coloring a plurality of inner colored regions in different states, it is also conceivable to independently color each inner colored region.

In this configuration, it is conceivable that the inner colored region is formed by using a plurality of color inks ejected from a plurality of color ink heads and a colorless ink ejected from a colorless ink head. Furthermore, in this case, it is conceivable to color the inner colored region with different colors depending on the position by differing an amount of each of the color inks of the plurality of colors to use depending on the position with respect to at least any of the plurality of positions. Then, in this case, it is conceivable to compensate for a difference in an amount of color ink used at each position in the inner colored region by the colorless ink. With this configuration, the thickness of the inner colored region in the normal direction can be appropriately adjusted to a predetermined thickness with high accuracy.

Regarding the compensation for the difference in the amount of color ink used, it is conceivable to approach the total amount of ink per unit volume of the amount of color ink used and the amount of colorless ink used to a predetermined reference amount. Furthermore, in this case, the total amount of ink may be adjusted to the reference amount by ejecting a large amount of colorless ink and removing the excess amount. Furthermore, the ink may be removed by scraping the ink with a flattening portion such as a roller.

The colorless ink is also preferably used when forming the surface side colored region. In this case, the surface side colored region is also formed by further using the colorless ink ejected from the colorless ink head. With this configuration, the surface side colored region can also be appropriately formed with high accuracy. Furthermore, in the colored product, for a plurality of coloring regions with color ink, it is conceivable to overlap more regions in the normal direction as described above. Then, in this case, it is conceivable to form all these regions by using colorless ink in addition to color ink. With this configuration, these plurality of regions can be appropriately formed with high accuracy.

Furthermore, in this configuration, clear ink may be used as the colorless ink. With this configuration, the above compensation can be appropriately performed while suppressing the influence on the color to be colored in the inner colored region or the like. The clear ink can be considered, a colorless and transparent ink with respect to visible light. Furthermore, depending on the quality required for the colored product, the use of the colored product, and the like, it is conceivable to use an ink other than the clear ink (e.g., white ink) as the colorless ink.

Furthermore, the colored regions to be overlapped in the normal direction are not necessarily overlapped continuously, and it is conceivable to overlap the colored regions to as to sandwich a non-colored region in between. More specifically, it is conceivable to further form a clear region, which is a region formed by clear ink, between the inner colored region and the surface side colored region in the normal direction. With such a configuration, a more diverse design can be expressed by forming a distance between the inner colored region and the surface side colored region. Thus, a colored product colored with higher quality can be manufactured.

Furthermore, in this configuration, the colored product is a stereoscopic shaped object. In this case, it is conceivable to further use a light reflecting ink head, which is an inkjet head that ejects light reflecting ink. Furthermore, in this case, a light reflecting region is further formed on the inner side of the inner colored region in the normal direction by using the light reflecting ink ejected from the light reflecting ink head. With such a configuration, a stereoscopic shaped object colored with high quality can be appropriately shaped.

Furthermore, in this case, the colored product to be manufactured can be considered as a three-dimensional (3D) product or the like. Furthermore, a device for executing the manufacturing of the colored product can be considered as a shaping device for shaping a stereoscopic shaped object. Moreover, it is conceivable to form the shaped object on a flat medium (media). In this case, the colored product to be manufactured can be considered a 2.5-dimensional (2.5D) product or the like.

Furthermore, when manufacturing a stereoscopic shaped object as a colored product, it is conceivable to manufacture a shaped object in which a cavity is formed on an inner side of the plurality of coloring regions. In this case, it is conceivable to install a light source such as a white LED in the cavity. Furthermore, in this case, it is conceivable to form the plurality of coloring regions so that the light generated by the light source installed in the cavity is transmitted to the outside of the shaped object. Even in this configuration, a stereoscopic shaped object colored with high quality can be appropriately shaped.

In addition, when shaping a stereoscopic shaped object as a colored product, it is conceivable to color the inner colored region and the surface side colored region according to the structure of an object (object to be shaped) indicated by the shaped object to be shaped. More specifically, in this case, it is conceivable to color the inner colored region with a color that matches the color inside the object to be shaped. Furthermore, it is conceivable to color the surface side colored region with a color that matches the color of a part on an outer side of the object to be shaped. In this case, the color of the part on the outer side of the object to be shaped can be considered as the color of the part on the outer side of the part (the inside of the object corresponding to the inner colored region) corresponding to the inner colored region in the object. With this configuration, the color of the object can be appropriately represented with high quality.

Furthermore, it is conceivable that the inner colored region and the surface side colored region are colored according to the way of appearing when the object to be shaped is observed. In this case, it is conceivable to color the surface side colored region so as to represent an object that appears on a part of the surface of the object to be shaped. An object appearing on a part of the surface of the object can be considered as an object visually recognized in a part of the surface of the object when observing the object. More specifically, an object that appears on a part of the surface of the object is an object that exists on the surface of the object. In this case, it is conceivable to color the inner colored region so as to represent an object in a state excluding an object appearing on a part of the surface. With this configuration, the way the object appears can be appropriately reproduced by the shaped object.

Furthermore, as the colored product, it is conceivable to manufacture a product other than the stereoscopic shaped object. In this case, it is conceivable to manufacture a colored product obtained by performing printing on a medium. Furthermore, such a colored product can be considered as a product created by forming a layer of ink on the medium. Then, in this case, the inner colored region formed by a layer of ink is formed by forming the layer of ink on the medium using at least one of the color ink heads and the colorless ink head. Then, the surface side colored region formed by a layer of ink is formed by further forming a layer of ink on the inner colored region using at least any of the color ink heads. Even in this configuration, a colored product colored with high quality can be appropriately manufactured.

Furthermore, in this case, the colored product to be manufactured can be considered as a two-dimensional (2D)

product or the like. Moreover, a device that executes the manufacturing of the colored product can be considered as a printing device that prints a two-dimensional image. Furthermore, even in a case where a colored product is manufactured by a printing device, it is conceivable to shape a stereoscopic shaped object as the colored product to be manufactured on the medium. In this case, it can be considered that the printing device manufactures a 2.5-dimensional (2.5D) product by the printing operation.

Furthermore, as the configuration of the present disclosure, an ink ejection device or the like having the same characteristics as described above can be considered. In this case as well, effects similar to the above can be obtained.

According to the present disclosure, a colored product colored with high quality can be appropriately manufactured.

BRIEF DESCRIPTION OF THE DRAWINGS

FIGS. 1A and 1B are views showing one example of a shaping device 10 according to one embodiment of the present disclosure.

FIGS. 2A to 2C are views describing a shaped object 50 manufactured by the shaping device 10.

FIGS. 3A and 3B are views describing a modified example of the configuration of the decorative region 156. FIG. 3A shows an example of the configuration of the decorative region 156 in the present modified example.

FIGS. 4A and 4B are views describing a further modified example of the shaped object 50.

DETAILED DESCRIPTION OF EMBODIMENTS

Figure 1A:
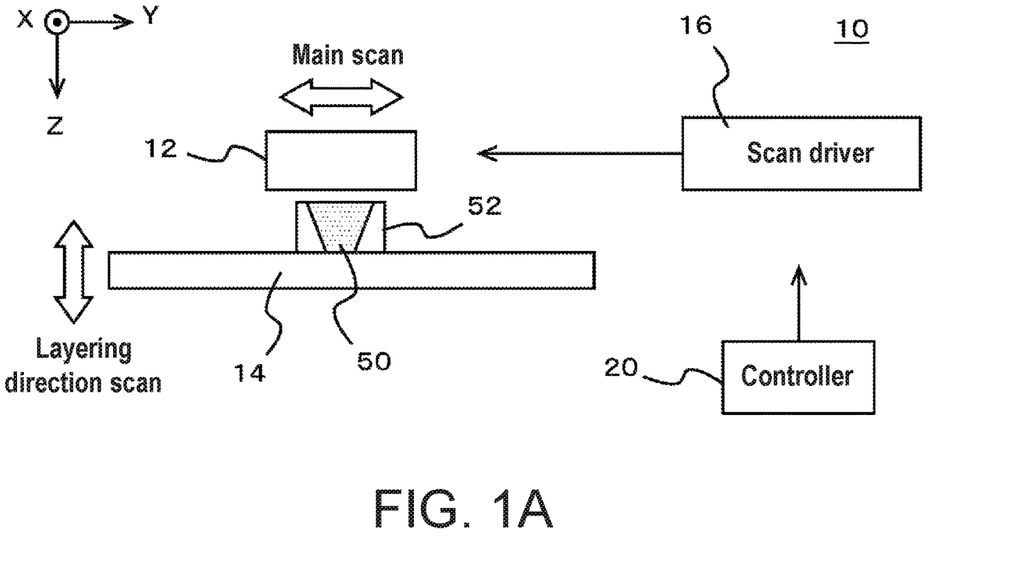
FIG. 1A shows one example of a configuration of a main part of the shaping device 10.
Figure 1B:
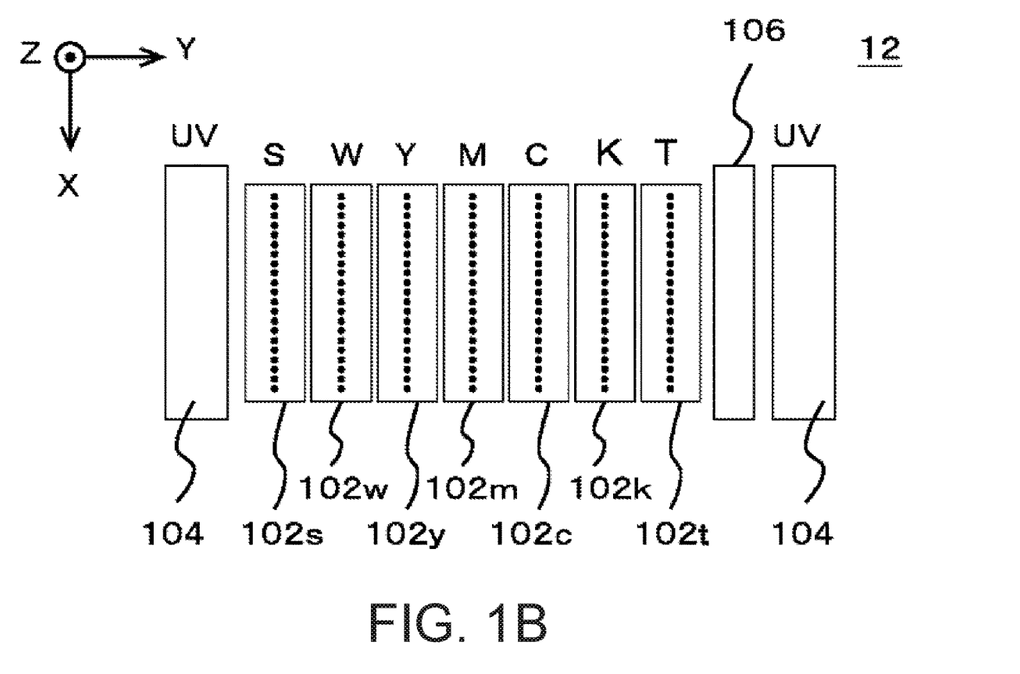
FIG. 1B shows an example of a configuration of a head portion 12 in the shaping device 10.

Hereinafter, an embodiment according to the present disclosure will be described with reference to the drawings. FIGS. 1A and 1B show one example of a shaping device 10 according to one embodiment of the present disclosure. FIG. 1A shows one example of a configuration of a main part of the shaping device 10. FIG. 1B shows an example of a configuration of a head portion 12 in the shaping device 10. Other than the points described below, the shaping device 10 may have features same as or similar to a known shaping device. More specifically, other than the points described below, the shaping device 10 may have a feature same as or similar to a known shaping device that carries out shaping by ejecting a droplet which is to become the material of a shaped object 50 using an inkjet head. Furthermore, other than the illustrated configuration, the shaping device 10 may also include various types of configurations necessary for shaping, and the like of the shaped object 50.

In this example, the shaping device 10 is an example of an ink ejection device, and a stereoscopic shaped object 50 is shaped through a layered shaping method. In this case, the layered shaping method is a method for shaping the shaped object 50 by overlapping a plurality of layers. The shaped object 50 is a stereoscopic three-dimensional structural object. Furthermore, as can be understood from the following description and the like, the shaping device 10 can be considered as a 3D printer or the like that performs shaping through an inkjet method. Moreover, in this example, the shaped object 50 is an example of a colored product which is a product colored using ink. In this case, the shaping device 10 can be considered as a device for manufacturing a colored product. Furthermore, the operation of the shaping device 10 can be considered as executing a manufacturing method for a colored product.

Furthermore, in the present example, the shaping device 10 includes a head portion 12, a shaping table 14, a scan driver 16, and a controller 20. The head portion 12 is a part that ejects the material of the shaped object 50. Furthermore, in the present example, ink is used as the material of the shaped object 50. In this case, the ink can be considered as a functional liquid or the like. Moreover, in the present example, the ink can be considered as liquid, and the like ejected from the inkjet head. In this case, the inkjet head can be considered as, an ejection head that ejects droplets of ink through an inkjet method.

More specifically, the head portion 12 ejects ink that cures according to predetermined conditions from a plurality of inkjet heads as a material of the shaped object 50. Then, each layer forming the shaped object 50 is formed in an overlapping manner by curing the ink after landing. Moreover, in the present example, an ultraviolet-curable ink (UV ink) that cures from a liquid state by irradiation of ultraviolet light is used as the ink. Furthermore, the head portion 12 further ejects a material of a support layer 52 in addition to the material of the shaped object 50. The head portion 12 thereby forms the support layer 52 at a periphery of the shaped object 50, and the like as necessary. The support layer 52 is a layered structural object that supports at least a part of the shaped object 50 being shaped. The support layer 52 is a layered structural object formed under a part with an overhang shape when shaping the shaped object 50 having an overhang shape. The support layer 52 is formed as necessary at the time of shaping the shaped object 50 and removed after the shaping is completed. A more specific configuration of the head portion 12 will be described in detail later.

The shaping table 14 is a table-shaped member that supports the shaped object 50 being shaped, and is disposed at a position facing the inkjet head in the head portion 12, and mounts the shaped object 50 being shaped and the support layer 52 on the upper surface thereof. Furthermore, in the present example, the shaping table 14 has a configuration in which at least the upper surface is movable in a layering direction (Z direction in the figure), and moves at least the upper surface in accordance with the progress of the shaping of the shaped object 50 by being driven by a scan driver 16. In this case, the layering direction can be considered the direction in which the shaping materials are layered in the layered shaping method. More specifically, in the present example, the layering direction is a direction orthogonal to the main scanning direction (Y direction in the figure) and the sub scanning direction (X direction in the figure) preset in the shaping device 10.

The scan driver 16 is a driver that causes the head portion 12 to perform a scanning operation of relatively moving with respect to the shaped object 50 being shaped. In this case, "relatively moving with respect to the shaped object 50 being shaped" means relatively moving with respect to the shaping table 14. Causing the head portion 12 to perform the scanning operation means causing the inkjet head of the head portion 12 to perform the scanning operation. Furthermore, in the present example, the scan driver 16 causes the head portion 12 to perform the main scan (Y scanning), the sub scan (X scanning), and the layering direction scan (Z scanning) as the scanning operation.

The main scan is an operation of ejecting ink while relatively moving in the main scanning direction with respect to the shaped object 50 being shaped. In the present example, the scan driver 16 causes the head portion 12 to perform the main scan by fixing the position of the shaping table 14 in the main scanning direction and moving the head portion 12 side. In a modified example of the configuration of the shaping device 10 the shaped object 50 side may be moved by fixing the position of the head portion 12 in the main scanning direction and moving the shaping table 14. Further, as will be described in more detail later, in this example, the head portion 12 further includes an ultraviolet light source. At the time of the main scan, the scan driver 16 further carries out the drive of an ultraviolet light source in the head portion 12. More specifically, the scan driver 16 lights the ultraviolet light source at the time of the main scan to cure the ink that landed on a surface to be shaped of the shaped object 50. The surface to be shaped of the shaped object 50 is a surface where a next layer of ink is formed by the head portion 12.

The sub scan means an operation of relatively moving with respect to the shaped object 50 being shaped in the sub scanning direction orthogonal to the main scanning direction. More specifically, the sub scan is an operation of relatively moving with respect to the shaping table 14 in the sub scanning direction by a feed amount set in advance. In the present example, the scan driver 16 causes the head portion 12 to perform the sub scan between the main scans. Furthermore, the scan driver 16 may cause the head portion 12 to perform the sub scan by fixing the position of the head portion 12 in the sub scanning direction and moving the shaping table 14. Moreover, the scan driver 16 may cause the head portion 12 to perform the sub scan by fixing the position of the shaping table 14 in the sub scanning direction and moving the head portion 12.

The layering direction scan is an operation of relatively moving the head portion 12 in the layering direction with respect to the shaped object 50 by moving at least one of the head portion 12 or the shaping table 14 in the layering direction. In this case, moving the head portion 12 in the layering direction means moving at least the inkjet head in the head portion 12 in the layering direction. Furthermore, moving the shaping table 14 in the layering direction means moving the position of at least the upper surface in the shaping table 14. The scan driver 16 adjusts the relative position of the inkjet head with respect to the shaped object 50 being shaped in the layering direction by causing the head portion 12 to perform the layering direction scan in accordance with the progress of the shaping operation. More specifically, in the layering direction scan of the present example, the scan driver 16 fixes the position of the head portion 12 in the layering direction and moves the shaping table 14. The scan driver 16 may fix the position of the shaping table 14 in the layering direction and move the head portion 12.

The controller 20 has a configuration of including a CPU of the shaping device 10, and controls the shaping operation in the shaping device 10 by controlling each portion of the shaping device 10. More specifically, the controller 20 controls each portion of the shaping device 10 based on shape information, color information and the like of the shaped object 50 to be shaped. According to the present example, the shaped object 50 can be appropriately shaped. The configuration of the shaped object 50 manufactured by the shaping device 10 of the present example will be described in more detail later.

Next, a more specific configuration of the head portion 12 will be described. In the present example, the head portion 12 includes a plurality of inkjet heads, a plurality of ultraviolet light sources 104, and a flattening roller 106. Furthermore, as illustrated in FIG. 1B, the plurality of inkjet heads includes an inkjet head 102s, an inkjet head 102w, an inkjet head 102y, an inkjet head 102m, an inkjet head 102c, an inkjet head 102k, and an inkjet head 102t. The plurality of inkjet heads is arranged side by side in the main scanning direction with their positions in the sub scanning direction aligned. Furthermore, each inkjet head includes a nozzle row, in which a plurality of nozzles is lined in a predetermined nozzle row direction, on a surface facing the shaping table 14. Moreover, in the present example, the nozzle row direction is a direction parallel to the sub scanning direction.

Among these inkjet heads, the inkjet head 102s ejects the material (support material) of the support layer 52. A known material for the support layer can be suitably used for the material of the support layer 52. Furthermore, in the present example, an ultraviolet curable ink having a weaker degree of curing by ultraviolet light than the material of the shaped object 50 is used for the material of the support layer 52. Furthermore, the inkjet head 102w is an example of a light reflecting ink head, and ejects ink of white color (w color), which is an example of a light-reflecting ink.

The inkjet head 102y, the inkjet head 102m, the inkjet head 102c, and the inkjet head 102k (hereinafter referred to as inkjet heads 102y to k) are examples of a plurality of color ink heads. Each of the inkjet heads 102y to k ejects color inks different from each other. Furthermore, in the present example, the inkjet heads 102y to k are coloring inkjet heads used when shaping the colored shaped object 50, and eject ink of each color of a plurality of color inks (coloring inks) used for coloring. More specifically, the inkjet head 102y ejects ink of yellow color (Y color). The inkjet head 102m ejects ink of magenta color (M color). The inkjet head 102c ejects ink of cyan color (C color). The inkjet head 102k ejects ink of black color (K color). In addition, in this case, each color of YMCK is an example of process colors used for full color representation.

The inkjet head 102t is an example of a colorless ink head that ejects colorless ink, and ejects clear ink, which is an example of colorless ink. In this case, the colorless ink can be considered as an ink that has not been intentionally colored. Furthermore, when referring to not performing coloring intentionally, this can be considered as not adding intentionally a coloring material such as a pigment or dye for coloring (e.g., a chromatic coloring material). The clear ink can be considered as a colorless transparent ink with respect to visible light.

The plurality of ultraviolet light sources 104 are light sources (UV light sources) for curing ink, and generate an ultraviolet light that cures the ultraviolet curable ink. Moreover, in the present example, each of the plurality of ultraviolet light sources 104 is disposed on one end side and the other end side in the main scanning direction in the head portion 12 so as to sandwich the plurality of inkjet heads in between. An UVLED (ultraviolet LED) and the like can be suitably used for the ultraviolet light source 104. Furthermore, it is also conceivable to use a metal halide lamp, a mercury lamp, and the like for the ultraviolet light source 104.

The flattening roller 106 is a flattening portion for flattening the layer of the ink formed during the shaping of the shaped object 50. Furthermore, the flattening roller 106 flattens the layer of ink by coming into contact with a surface of the layer of ink and removing one part of the ink before curing at the time of the main scan. In this case, it can be considered that the flattening roller 106 flattens the layer of ink by scraping the ink.

The layer of ink forming the shaped object 50 can be appropriately formed by using the head portion 12 having the above configuration. Furthermore, the shaped object 50 can be appropriately shaped by forming a plurality of layers of ink in an overlapping manner.

The specific configuration of the head portion 12 is not limited to the configuration described above and can be variously modified. The head portion 12 may further include an inkjet head for a color other than the YMCK as an inkjet head for coloring. Furthermore, the arrangement of a plurality of inkjet heads in the head portion 12 can be variously modified. The positions in the sub scanning direction of some inkjet heads may be shifted from the other inkjet heads.

Figure 2A:
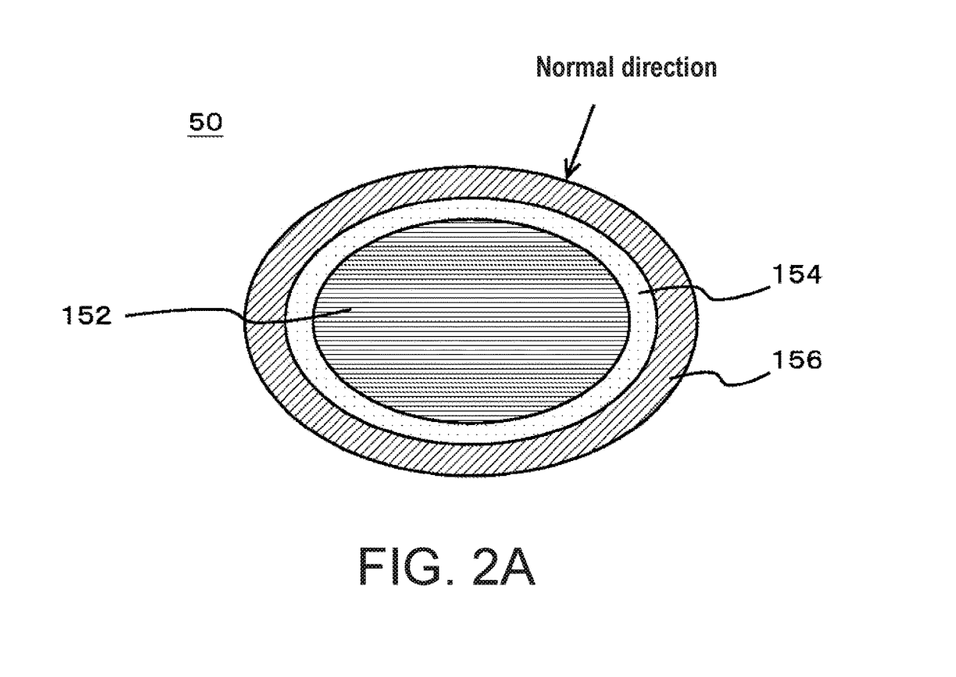
FIG. 2A shows an example of a configuration of the shaped object 50.
Figure 2B:
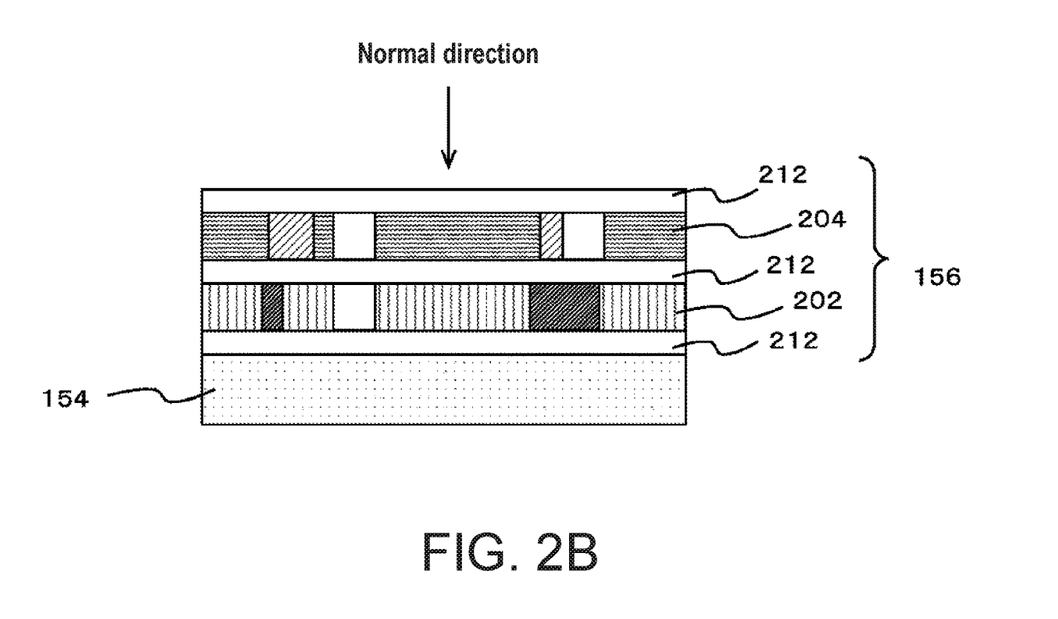
FIG. 2B shows an example of a configuration of a decorative region 156 in the shaped object 50.
Figure 2C:
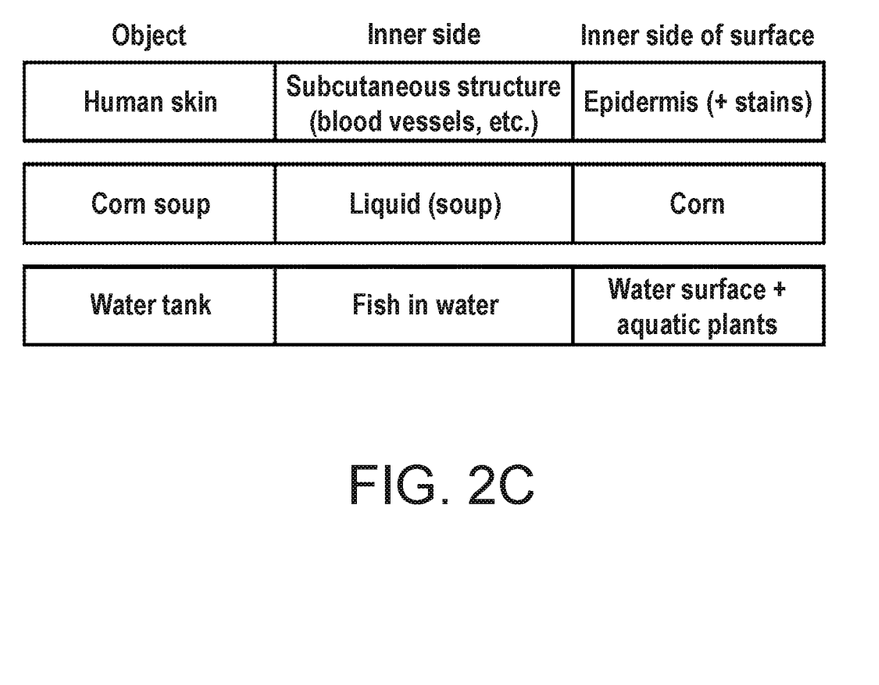
FIG. 2C shows an example of an object to be shaped.

Subsequently, the configuration and the like of the shaped object 50 manufactured by the shaping device 10 will be described in more detail. FIGS. 2A to 2C are views describing the shaped object 50 manufactured in the shaping device 10 of the present example. FIG. 2A is a view showing an example of the configuration of the shaped object 50, and shows an example of the cross-sectional configuration of the shaped object 50 having an elliptical spherical shape (e.g., shape like a rugby ball). FIG. 2B is a cross-sectional view showing an example of the configuration of a decorative region 156 in the shaped object 50.

In the present example, the shaping device 10 manufactures (shapes) a shaped object 50 including a bulk region 152, a light reflecting region 154, and the decorative region 156. In this case, the shaping device 10 manufactures a shaped object including these regions by forming layers of ink containing a part of each of these regions, as needed, in an overlapping manner in the layering direction.

Furthermore, among these regions, the bulk region 152 is a region (internal region) that forms the shape of the shaped object 50 by forming the inside of the shaped object 50, and is formed inside the shaped object 50 so that the periphery is solidified by the light reflecting region 154 and the decorative region 156. In this case, the bulk region 152 may be formed with an arbitrary color. More specifically, in the present example, the shaping device 10 forms the bulk region 152 with ink ejected from an arbitrary inkjet head other than the inkjet head 102s (see FIGS. 1A and 1B) in the head portion 12.

In the modified example of the configuration of the shaped object 50, it is conceivable to make the part corresponding to the bulk region 152 hollow. In this case, it can be considered that the shaped object 50 is configured by the light reflecting region 154 and the decorative region 156. Furthermore, in this case, it is conceivable that the mechanical strength of the shaped object 50 is maintained by the light reflecting region 154. Therefore, in this case, it is preferable to form the light reflecting region 154 with a sufficient thickness (e.g., a thickness of greater than or equal to 1 mm) in terms of strength.

The light reflecting region 154 is a light reflecting region formed around the bulk region 152. In the present example, the light reflecting region 154 is formed between the bulk region 152 and the light reflecting region 154 so as to surround the periphery of the bulk region 152 and so that the periphery is solidified by the decorative region 156. Thus, the light reflecting region 154 reflects the light entering from the outside of the shaped object 50 through the decorative region 156. With this configuration, the light reflecting region 154 can be appropriately functioned as the background of the decorative region 156. Furthermore, in this case, the light reflecting region 154 can be considered as a region that functions as a background of the decorative region 156.

In the present example, the shaping device 10 forms the light reflecting region 154 using white ink ejected from the ink jet head 102w (see FIGS. 1A and 1B). In this case, it is conceivable to form the light reflecting region 154 only with white ink. Furthermore, depending on the quality required for the shaped object 50, it is conceivable to form the light reflecting region 154 by further using the clear ink in addition to the white ink. Moreover, the shaping device 10 forms the light reflecting region 154 so that, the thickness in the normal direction of the surface of the shaped object 50 is about 50 to 300 μm. The thickness of the light reflecting region 154 in the normal direction is preferably about 150 to 300 μm.

The decorative region 156 is a region to be decorated on the surface of the shaped object 50. In this case, the surface of the shaped object 50 can be considered as a part where hue can be visually recognized from the outside of the shaped object 50. Furthermore, in the present example, the decorative region 156 is formed on the surface of the shaped object 50 so as to surround the light reflecting region 154. More specifically, in the present example, the shaping device 10 forms the decorative region 156 using color ink of each color ejected from the inkjet heads 102y to k (see FIGS. 1A and 1B) and clear ink ejected from the inkjet head 102t (see FIGS. 1A and 1B). Thus, the shaping device 10 forms the decorative region 156 colored in full color representation. In this case, the full color representation can be considered as representation of colors performed with a possible combination of the subtractive color mixing method using the inks of process colors. Furthermore, depending on the color to be colored in the decorative region 156 the decorative region 156 may be formed by further using white ink ejected from the inkjet head 102w. In this case, it is conceivable to use the white ink as a special color ink other than the process color.

Furthermore, in the present example, the shaping device 10 forms the decorative region 156 formed by a plurality of regions, as shown in FIG. 2B. In this case, the shaping device 10 forms the decorative region 156 so that the thickness in the normal direction of the surface of the shaped object 50 is about 80 to 300 μm. The thickness of the decorative region 156 in the normal direction can be considered as the total thickness of a plurality of regions forming the decorative region 156. More specifically, in FIG. 2B, for a part of the decorative region 156, an example of a plurality of regions forming the decorative region 156 is illustrated together with a part of the light reflecting region 154. Furthermore, in this case, for the sake of convenience of illustration, an example of the cross-sectional configuration of the light reflecting region 154 and the decorative region 156 is shown for the light reflecting region 154 and the decorative region 156 with the normal direction in the surface of the shaped object 50 constant.

In a case illustrated in FIG. 2B, the decorative region 156 includes a color region 202, a color region 204, and a plurality of clear regions 212. In this case, the shaping device 10 is formed so as to overlap these regions in the normal direction of the surface of the shaped object 50. Furthermore, the color region 202 and the color region 204 are regions formed in a state of being colored with colored color ink. In this case, the configuration of the decorative region 156 can be considered as a configuration in which multiple color regions are formed.

Furthermore, the plurality of clear regions 212 are transparent regions formed by clear ink. Regarding the clear region 212, the fact that it is a transparent region can be considered that, it is a region that is substantially transparent to visible light. Furthermore, the plurality of clear regions 212 can be considered as colorless transparent regions that are not colored. Moreover, in the present example, the decorative region 156 can be considered as a region in which a plurality of colored regions (color region 202 and color region 204) are overlapped in the normal direction of the surface of the shaped object 50. In addition, the decorative region 156 can be considered that, a plurality of colored regions is overlapped with a transparent region (clear region 212) in between.

Furthermore, in the present example, the shaping device 10 colors the color region 202 and the color region 204 in different states from each other. In this case, coloring in different states from each other means coloring so as to show different images, coloring with different colors, and the like. Furthermore, coloring in different states from each other can be considered as coloring independently of each other. With such a configuration, coloring of high designability can be performed by overlapping a plurality of color regions colored in different states. Furthermore, it becomes possible to represent an image with a sense of depth by overlapping a plurality of color regions. As described above, in the present example, the clear region 212 is formed between the color region 202 and the color region 204 in the normal direction. With such a configuration, a more diverse design can be expressed by forming a distance between a plurality of color regions colored in different states. Furthermore, it becomes possible to enhance the sense of depth of the image by forming the clear region 212 between the color region 202 and the color region 204. Therefore, according to the present example, a high-quality colored shaped object 50 can be more appropriately manufactured.

Here, as can be understood from the above description and the like, the inks of each color of YMCK used in the present example are inks for performing color representation through subtractive color mixing. In this case, as the ink of each color, an ink that transmits a certain amount of light according to the color of the ink is used. Furthermore, in this case, it is conceivable to set the color strength in the plurality of color regions so that a certain amount of light is transmitted even in the entire decorative region 156. More specifically, it is conceivable to adjust the amount of light transmitted through the decorative region 156 as a whole to a range in which the color can be represented by the subtractive color mixing method by having the light reflecting region 154 function as a background.

Furthermore, as described above, in the present example, the shaping device 10 shapes the shaped object 50 through the layered shaping method. Then, in this case, it can be considered that a plurality of layers of ink are overlapped for the structure of the shaped object 50. Furthermore, as described above, in the present example, the decorative region 156 has a plurality of regions that overlap in the normal direction of the surface of the shaped object 50. In this regard, at first glance, it seems confusing about the overlapping of ink layers in the layering direction and the overlapping of a plurality of regions in the decorative region 156. However, in the shaped object 50, the normal direction of the surface is a direction that changes depending on the position of the shaped object 50. Therefore, the overlapping of a plurality of regions in the decorative region 156 can be considered as overlapping of regions in a sense different from the overlapping of layers of ink in the layering direction. Moreover, in this case, each region forming the decorative region 156 can be considered as a layered region or the like formed with different intentions, instead of a layer of ink layered through the layered shaping method. Furthermore, in this case, depending on the method of setting the thickness of each region, and the like, it is conceivable that each region forming the decorative region 156 and the layer of ink layered through the layered shaping method are the same in one part of the shaped object 50.

Furthermore, in the present example, the color region 204 is an example of the surface side colored region. Furthermore, the color region 202 is an example of the inner colored region. In this case, the surface side colored region can be considered as a region closest to the surface of the shaped object 50 in the normal direction among a plurality of regions to be colored in the decorative region 156 of the shaped object 50. The inner colored region can be considered as a region located farther from the surface of the shaped object 50 than the surface side colored region in the normal direction among a plurality of regions to be colored in the decorative region 156 of the shaped object 50. Furthermore, in this case, it can be considered that the light reflecting region 154 of the shaped object 50 is formed on the inner side than the color region 202 which is an inner region.

Furthermore, in the present example, the shaping device 10 is formed so that the thickness of the surface of the shaped object 50 in the normal direction is a predetermined thickness for each region forming the decorative region 156. In this case, it can be considered that regarding each region, forming to the predetermined thickness includes forming to have a predetermined constant thickness along the shape of the outer surface of the shaped object 50. Furthermore, regarding each region, it can be considered that forming to the predetermined thickness includes having the design thickness to a predetermined thickness. Having the design thickness to a predetermined thickness can be considered as obtaining a predetermined thickness within an allowable range assumed according to an error or deviation caused by the specifications and the like of the shaping device 10. Furthermore, in this case, when the predetermined thickness is obtained for each region, it can be considered that the difference between the thickness at each position of the region and the design thickness with respect to the relevant layer is within the allowable range.

Moreover, the thickness (predetermined thickness) of each layer may be different for every layer. The thickness of the color region 202 in the normal direction may be different from the thickness of the color region 204 in the normal direction. Furthermore, with respect to the plurality of clear regions 212 included in the decorative region 156, the thickness of some clear regions 212 in the normal direction may be different from the thickness of the other clear regions 212 in the normal direction. Of the plurality of clear regions 212 included in the decorative region 156, the clear region 212 formed outside the color region 204 can be considered as a protective layer or the like that protects the surface of the shaped object 50. In this case, it is conceivable to differ the thickness of the clear region 212 formed as the protective layer from the thickness of the other clear regions 212.

More specifically, it is considered that the thicknesses in the normal direction of the color region 202 and the color region 204 among the regions forming the decorative region 156 are determined according to the object to be expressed by the decorative region 156. Furthermore, as an example, the thickness of the color region 202 in the normal direction may be about 20 to 100 µm. The thickness of the color region 204 in the normal direction may be about 20 to 50 µm. In this case, it can be considered that the thickness of the color region 204 formed on the surface side in the decorative region 156 is thinner than the thickness of the color region 202 on the inner side. With this configuration, the colors of the color region 202 can be visually recognized more appropriately from the outside of the shaped object 50 through the color region 204. Furthermore, the thickness in the normal direction of the clear region 212 formed on the surface of the shaped object 50 as a protective layer among the plurality of clear regions 212 may be about 30 to 150 µm. The thickness in the normal direction of the clear region 212 other than the clear region 212 for the protective layer may be about 30 to 250 µm. Furthermore, in this case, the decorative region 156 formed at a position closer to the light reflecting region 154 than any color region in the decorative region 156 can be considered as a separation region that separates the color region and the light reflecting region 154 in the decorative region 156. Furthermore, in this case, it is conceivable to have the thickness in the normal direction of the clear region 212 used as the separation region so as to be smaller than the other clear regions 212. Moreover, in this case, the thickness in the normal direction of the clear region 212 for the separation region may be about 30 to 60 µm. With these configurations, each region forming the decorative region 156 can be appropriately formed.

Furthermore, when the decorative region 156 is formed so that a plurality of regions overlaps as in the present example, if the thickness of each region changes depending on the position, an unintended change occurs in the position of each region in the normal direction, and the way the shaped object 50 appears may be affected. Therefore, it is preferable to form each region so that the difference in thickness between positions is less likely to occur. Therefore, in the present example, the shaping device 10 forms the color region 202 and the color region 204 using the color inks ejected from the inkjet heads 102y to k and the clear ink ejected from the inkjet head 102. In this case, forming the color region 202 or the color region 204 using the color ink and the clear ink can be considered as forming the color region 202 or the color region 204 using the color ink of at least one color and the clear ink.

More specifically, in the present example, the shaping device 10 forms the color region 202 and the color region 204 while changing the color to be colored for each position as necessary by using the ink of each color of YMCK, which are color inks of a plurality of colors, and the clear ink. Furthermore, in this case, coloring with colors that differ depending on the position is performed on each position of the color region 202 and the color region 204 by differing the amount of color ink of each color of YMCK to use depending on the position. In this case, differing the amount of color ink of each color of YMCK to use depending on the position can be considered as differing the amount of color ink of each color of YMCK depending on the position for at least one of a plurality of positions. Furthermore, differing the amount of color ink of each color of YMCK to use depending on the position can also be considered as differing the amount of color ink of each color of YMCK to use depending on the position, as necessary, in accordance with the color to be colored for each position. Moreover, in this case, the clear ink further compensates for the difference in the amount of color ink used at each position of the color region 202 and the color region 204. With this configuration, the thicknesses of the color region 202 and the color region 204 in the normal direction can be appropriately adjusted to a predetermined thickness set in advance for each region with high accuracy. Thus, each region forming the decorative region 156 can be appropriately formed at a predetermined position in the normal direction. In addition, in this case, by using the clear ink as the compensation ink, the above compensation can be appropriately performed while suppressing the influence on the color to be colored with respect to the color region 202 and the color region 204.

Here, regarding the color region 202 and the color region 204, compensating for the difference in the amount of color ink used with clear ink can be considered as approaching the total amount of ink of the amount of color ink used and the amount of clear ink used (amount of ink per unit volume) to a predetermined reference amount. Furthermore, when removing a part of the ink by using the flattening roller 106 (see FIGS. 1A and 1B) at the time of forming the layer of ink as in the present example, a large amount of clear ink may be ejected by the inkjet head 102t and the excess amount can be removed to adjust the total amount of ink to the reference amount.

Furthermore, more specifically, it is conceivable that at the time of forming the color region 202 and the color region 204 in the decorative region 156, the amount of color ink becomes relatively small in a part where the color density is low (bright color) as compared with a part where the color density is dark, and as a result, the thickness of the color region in the normal direction becomes uneven. Although such unevenness does not pose a big problem at the time of two-dimensional decoration, it causes the three-dimensional outer shape to collapse in a device for manufacturing the shaped object 50, which is a product having a three-dimensional shape. On the other hand, as a countermeasure therefor, as described above, it is conceivable to supplement the clear ink in the part where the color density is low so that the recess does not form. With this configuration, the thickness of the color region in the normal direction can be made constant regardless of the location. In this case, as a simple method, a sufficient amount of clear ink may be supplemented regardless of the color density, and the excess amount may be removed by the flattening roller 106 shown in FIG. 1B to flatten.

As described above, according to the present example, the color region 202 and the color region 204 can be appropriately formed with a predetermined thickness set in advance with high accuracy. Thus, in the decorative region 156, a plurality of regions can be appropriately overlapped with high accuracy in the normal direction of the surface of the shaped object 50. Therefore, according to the present example, the shaped object 50 colored with high quality can be appropriately manufactured with high accuracy.

Furthermore, as described above, in the present example, the color region 202 and the color region 204 are formed by using the color ink and the clear ink. In this regard, it is conceivable to form in the shaped object 50, the decorative region 156 in which more color regions are overlapped in the normal direction. In this case, the outermost color region (the surface side of the shaped object 50) in the decorative region 156 can be considered as an example of the surface side colored region. Moreover, the other color regions can be considered as an example of the inner colored region. In this case, it is preferable that all the color regions in the decorative region 156 are formed using the color ink and the clear ink. With this configuration, the decorative region 156 in which a plurality of color regions is overlapped can be appropriately formed with high accuracy.

Furthermore, depending on the quality required for the shaped object 50, it is conceivable to form a part of the plurality of color regions of the decorative region 156 only with the color ink without using the clear ink. In this case, it is conceivable to form the outermost color region (the surface side of the shaped object 50) in the decorative region 156 only with the color ink, and to form the other color regions with the color ink and the clear ink. With this configuration, the thickness in the normal direction of the color region formed on the inner side of the other color region can be appropriately adjusted to a predetermined thickness set in advance with high accuracy. Thus, each region forming the decorative region 156 can be appropriately formed at a predetermined position in the normal direction.

Next, the object indicated by the shaped object 50 of the present example will be described in more detail. FIG. 2C is a view showing an example of an object (object to be shaped) indicated by the shaped object 50. In this case, the object indicated by the shaped object 50 can be considered as an object represented by the shaped object 50. Furthermore, before the shaping of the shaped object 50 is completed, the object to be shaped can be considered as the object indicated by the shaped object 50 to be shaped by the shaping device 10.

Furthermore, as described above, in the present example, the shaping device 10 performs coloring on the color region 202 and the color region 204 in different states from each other. In this case, it is conceivable to prepare a plurality of different image data indicating the method of coloring the color region 202 and the color region 204, and represent the image corresponding to each image data by the color region 202 and the color region 204. With this configuration, a plurality of color regions representing different images can be appropriately formed by being overlapped in the normal direction of the surface of the shaped object 50.

Furthermore, when the configuration of the shaped object 50 in the present example is considered in relation to the image data corresponding to the color region 202 and the color region 204, it is conceivable to dispose the light reflecting region 154 on the inner side of a plurality of regions corresponding to a plurality of different image data. Moreover, it can be considered that at least some clear regions 212 in the decorative region 156 are disposed between a plurality of regions corresponding to a plurality of different image data. Furthermore, regarding the operation of compensating with clear ink described above, it can be considered to compensate for the shortage of color ink generated according to the data with clear ink for a plurality of regions corresponding to a plurality of different image data.

Furthermore, in the present example, it is conceivable to color the plurality of color regions in the decorative region 156 according to the structure of the object to be shaped. In this case, it is conceivable to color the color region 204 on the surface side of the decorative region 156 according to the color of the part forming the surface of the object. Furthermore, it is conceivable to color the color region 202 on the inner side in the decorative region 156, according to the color of the part forming the inside of the object. In this case, it can be considered to color the color region 202 with a color that matches the color of the inside the object to be shaped. Furthermore, it can be considered to color the color region 204 with a color that matches the color of the part on the outer side of the object to be shaped. In this case, the color of the part on the outer side of the object to be shaped can be considered as the color of the part on the outer side of the part (the inside of the object corresponding to the color region 202) corresponding to the color region 202 in the object.

Furthermore, it is conceivable that the plurality of color regions in the decorative region 156 are performed according to the way of appearing when the object to be shaped is observed. In this case, it is conceivable that the color region 204 on the surface side of the decorative region 156 is colored, so as to represent an object appearing on a part of the surface of the object to be shaped. In this case, the object appearing on a part of the surface of the object can be considered as an object visually recognized in a part of the surface of the object when observing the object. Furthermore, an object appearing on a part of the surface of the object can be considered as an object existing on the surface of the object. In this case, it is conceivable to color the color region 202 on the inner side of the decorative region 156 so as to represent an object in a state excluding an object appearing on a part of the surface. With this configuration, the way the object appears can be appropriately reproduced by the shaped object 50.

Furthermore, the method of coloring described above can be suitably used, when an object as shown in FIG. 2C is adopted as an object to be shaped. More specifically, as an example of a case where coloring is performed according to the structure of the object to be shaped, representing the human skin by the shaped object 50 can be considered. Furthermore, in this case, it is conceivable to represent the subcutaneous structure in the inner color region 202 and represent the state of the epidermis in the outer color region 204. In this case, it is conceivable to color the color region 202 based on image data showing blood vessels and the like. Furthermore, it is conceivable to color the color region 204 based on image data showing the state of the epidermis, including spots (melanin pigment) and the like. Moreover, in this case, the image used for coloring the color region 202 can be considered as an image of a blood vessel layer, or the like. Furthermore, the image used for coloring the color region 204 can be considered as an image of a melanin pigment layer, or the like. The shaped object 50 that reproduces the texture of human skin and the like with high quality can be shaped by coloring the color region 202 and the color region 204 in such a manner.

Furthermore, as an example of coloring according to the way of appearing when the object to be shaped is observed, representing corn soup with the shaped object 50 is considered. In this case, it is considered to represent soup in the inner color region 202 and to represent corn in the outer color region 204 by using soup data, which is the image data indicating the liquid part of the corn soup, and corn data, which is the image data indicating the corn floating in the soup. Furthermore, as an example of a case where coloring is performed according to the way of appearing when the object to be shaped is observed, representing a water tank containing fish and aquatic plants with the shaped object 50 is considered. In this case, it is conceivable to represent the fish in the water in the inner color region 202 and represent the water surface on which aquatic plant floats in the outer color region 204.

Furthermore, the configuration of the decorative region 156 and the method of coloring the plurality of color regions in the decorative region 156 are not limited to the specific examples described above, and various changes can be made. As described above, it is conceivable to color the plurality of color regions in the decorative region 156 in different states. Then, in this case, it is usually conceivable to color each color region under the same conditions such as resolution. However, in the modified example of the configuration of the decorative region 156, each of the plurality of color regions in the decorative region 156 may be colored under different conditions. In this case, it is conceivable to color each color region with different resolutions.

Furthermore, in the above description, an example of a case where clear ink is used as the colorless ink used at the time of forming the color region 202 and the color region 204 has been mainly described. However, depending on the quality required for the shaped object 50, the application of the colored product, and the like, it is conceivable to use white ink as the colorless ink. More specifically, in this case, in the color region 202 formed on the innermost side of the plurality of color regions in the decorative region 156, it is conceivable to use white ink as the compensation ink instead of the clear ink. Furthermore, in this case, it is conceivable to function the color region 202 as a background for color representation in the subtractive color mixing method, together with the light reflecting region 154. Moreover, when the function as a background can be sufficiently obtained only by the color region 202, it is conceivable to omit the light reflecting region 154 in the shaped object 50.

Figure 3A:
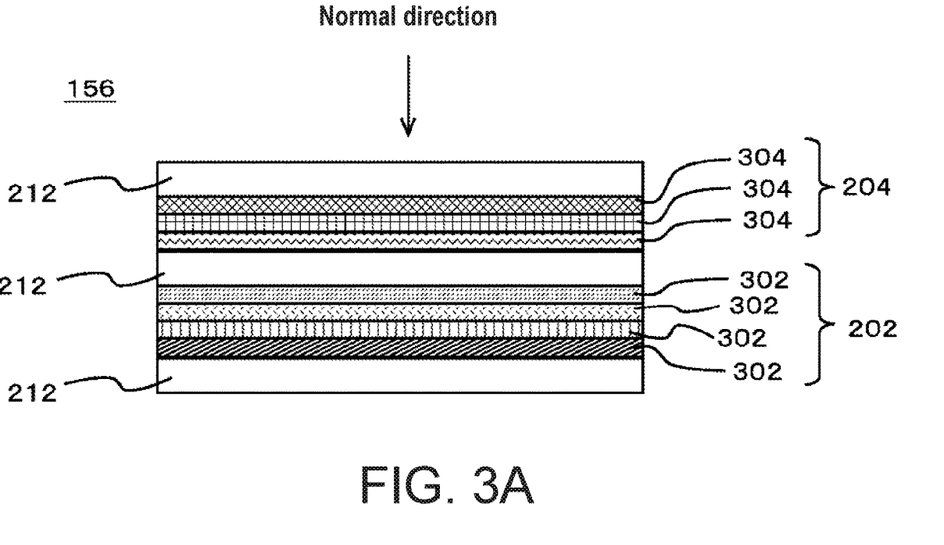
Figure 3B:
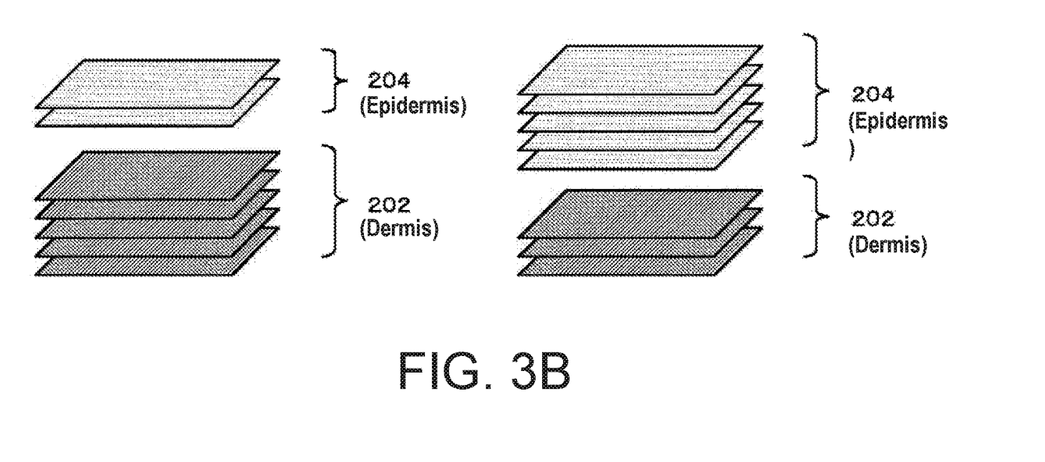
FIG. 3B shows an example of the colors in the color region 202 and the color region 204 in the present modified example.

Furthermore, the method of coloring the plurality of color regions in the decorative region 156 is not limited to the method described above, and can be variously changed. FIGS. 3A and 3B are views describing a modified example of the configuration of the decorative region 156. FIG. 3A shows an example of the configuration of the decorative region 156 in the present modified example. FIG. 3B shows an example of the colors in the color region 202 and the color region 204 in the present modified example. Other than the points described below, in FIGS. 3A and 3B, the configurations denoted with the same reference numbers as FIGS. 1A, 1B, 2A, 2B and 2C may have features same as or similar to the configurations in FIGS. 1A, 1B, 2A, 2B and 2C.

In the present modified example as well, the decorative region 156 includes a color region 202, a color region 204, and a plurality of clear regions 212. Furthermore, these regions are formed in an overlapping manner in the normal direction of the surface of the shaped object 50 (see FIGS. 2A to 2C), similar to the case shown in FIG. 2B. Moreover, in the present modified example, a configuration in which a plurality of regions is overlapped in the normal direction is used for the color region 202 and the color region 204. More specifically, in the present modified example, the color region 202 has a plurality of thin layered regions 302 overlapping in the normal direction. Furthermore, the color region 204 has a plurality of thin layered regions 304 overlapping in the normal direction.

In this case, the thin layered region 302 is a layered region that forms a part of the color region 202 in the normal direction. Furthermore, the colors of the plurality of thin layered regions 302 are designated independently of each other. In this case, it can be considered that the color of the color region 202 is a color represented by overlapping a plurality of colors in the normal direction. Similarly, the thin layered region 304 is a layered region that forms a part of the color region 204 in the normal direction. Furthermore, the colors of the plurality of thin layered regions 304 are designated independently of each other. In this case, it can be considered that the color of the color region 204 is a color represented by overlapping a plurality of colors in the normal direction. With such a configuration, various colors, textures, and the like can be represented more appropriately in the color region 202 and the color region 204. In addition, this makes it possible to appropriately manufacture a colored shaped object 50 with a higher quality.

Furthermore, in this case, it is conceivable to select the colors of the plurality of thin layered regions 302 forming the color region 202 from a color group selected in advance as the color group for the color region 202. Moreover, it is conceivable to select the colors of the plurality of thin layered regions 304 forming the color region 204 from a color group selected in advance as the color group for the color region 204. In this case, a color group is a set containing a plurality of colors. Furthermore, it is conceivable to select the color group corresponding to each of the color region 202 and the color region 204 based on the structure of the object to be shaped.

More specifically, when the human skin is represented by the shaped object 50, as shown in FIG. 3B, it is conceivable to select the color group corresponding to each of the color region 202 and the color region 204 in accordance with the structure of the skin including the dermis and the epidermis. In this case, a color group for the dermis including a plurality of colors corresponding to the color of the dermis of the skin and a color group for the epidermis including a plurality of colors corresponding to the color of the epidermis of the skin are prepared in advance. As the color group for the dermis, it is conceivable to use a color group including a plurality of reddish colors reflecting the color of blood. Furthermore, as the color group for the epidermis, it is conceivable to use a color group including a plurality of colors reflecting the color of the surface of human skin. In this case, the color group for the dermis is selected as the color group for the color region 202, and the color group for the epidermis is selected as the color group for the color region 204. Then, each color of the plurality of thin layered regions 302 in the color region 202 is selected from the colors included in the color group for the dermis. Furthermore, each color of the plurality of thin layered regions 304 in the color region 204 is selected from the colors included in the color group for the epidermis. With this configuration, the colors of the plurality of thin layered regions 302 in the color region 202 and the plurality of thin layered regions 304 in the color region 204 can be easily and appropriately set according to the object to be shaped.

It is conceivable to select the color of each of the thin layered region 302 and the thin layered region 304 according to the color and texture of the skin to be represented. In this case, various textures and colors can be represented by individually and variously changing the color of each thin layered region 302 in the color region 202 and the color of each thin layered region 304 in the color region 204. Furthermore, it is conceivable to automatically determine the colors of the respective thin layered regions 302 and the thin layered regions 304 by a computer or the like based on parameters indicating the color or texture to be represented.

Furthermore, the method of coloring as in the present modified example can be suitably used for objects other than the shaped object 50 representing human skin. It can be suitably used when attempting to represent the eyes of humans and other living things in the shaped object 50. In this case, in the decorative region 156 including a plurality of color regions, it is conceivable to represent the texture of the white eyes by a part of the color regions and the texture of the iris by at least a part of the other color regions. Furthermore, it is conceivable to color each part of the shaped object 50 at high quality by using a color that matches the relevant part by changing the color group associated with each color region according to the position of the shaped object 50. More specifically, when shaping a shaped object 50 (e.g., a figure) indicating a human being, it is conceivable to use a color group that matches the structure of the skin for the skin part, and use a color group that matches the structure of the eye for the eye part. Furthermore, in this case, for the lip part and the like, it is conceivable to use a color group that matches the lip part. With this configuration, the shaped object 50 colored according to the texture and color of each part of the object can be shaped more appropriately.

Here, in the present modified example as well, the color region 204, which is the color region formed on the most surface side in the decorative region 156, can be considered as an example of the surface side colored region. Furthermore, the color region 202 formed on the inner side than the color region 204 can be considered as an example of the inner colored region. Moreover, in the case of the present modified example, each thin layered region 302 in the color region 202 and each thin layered region 304 in the color region 204 can be considered as individual-colored regions. In this case, the thin layered region 304 on the most surface side in the color region 204 can be considered as an example of the surface side colored region. Furthermore, the other thin layered region 304 in the color region 204 and the plurality of thin layered regions 302 in the color region 202 can be considered as an example of the inner colored region.

In addition, the configuration of the shaped object 50 to be shaped by the shaping device 10 is not limited to the configuration described above, and further modification and the like can be performed. Furthermore, as described above, the shaped object 50 is an example of a colored product. Then, as a colored product, it is conceivable to create a product other than the shaped object 50.

Figure 4A:
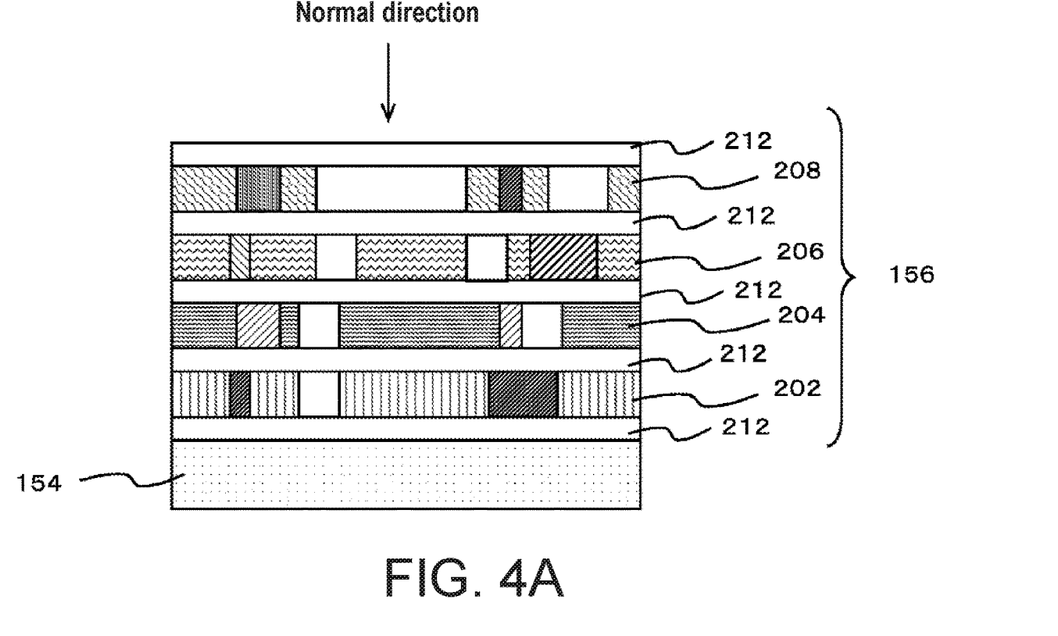
FIGS. 4A and 4B show an example of the configuration of a further modified example of the shaped object 50.
Figure 4B:
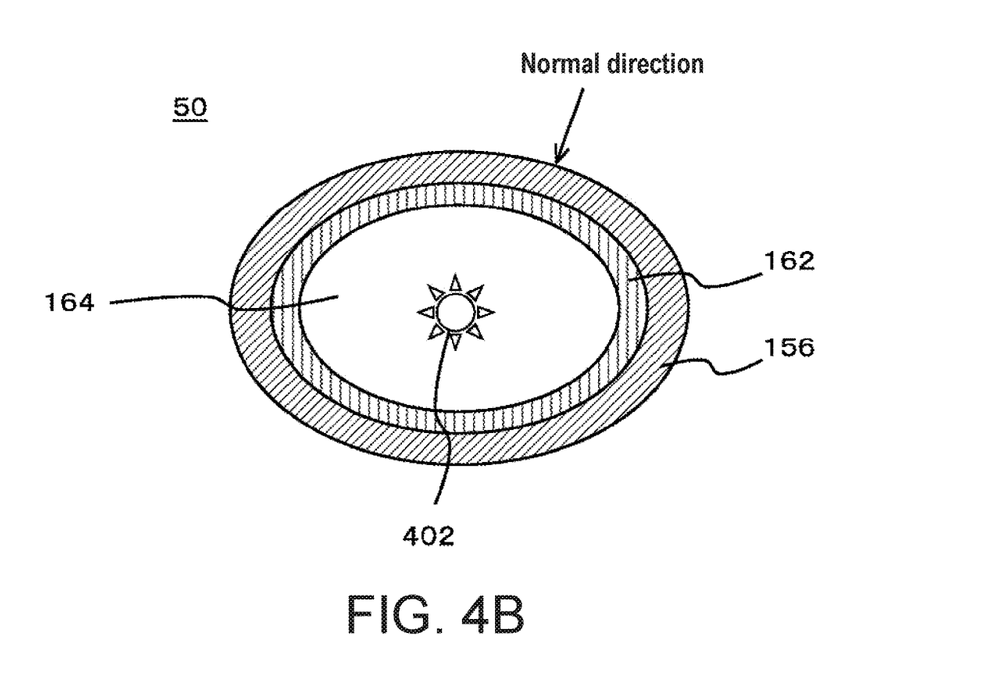

FIGS. 4A and 4B are views describing a further modified example of the shaped object 50. FIGS. 4A and 4B show an example of the configuration of a further modified example of the shaped object 50. Other than the points described below, in FIGS. 4A and 4B, the configuration denoted with the same reference numbers as FIGS. 1A to 3B may have features same as or similar to the configuration in FIGS. 1A to 3B.

In the above description, the operation and the like when forming two color regions (color region 202 and color region 204) have been mainly described regarding the plurality of color regions in the decorative region 156. However, when attempting to perform shaping with higher quality, it is conceivable to overlap more color regions in the normal direction in the decorative region 156. In this case, the color region on the most surface side in the decorative region 156 can be considered as an example of the surface side colored region. Furthermore, the other plurality of color regions can be considered as an example of the inner colored region.

More specifically, in a case of the configuration shown in FIG. 4A, the decorative region 156 includes a color region 202, a color region 204, a color region 206, and a plurality of clear regions 212. Furthermore, the color region 202, the color region 204, and the color region 206 are overlapped in the normal direction of the surface of the shaped object 50 while sandwiching the clear region 212 in between so that the color region 202 is on the most light reflecting region 154 side and the color region 206 is on the most surface side. In this case, the color region 206 can be considered as an example of the surface side colored region. Furthermore, the color region 202 and the color region 204 can be considered as an example of the inner colored region. Moreover, in this case, it is conceivable to color the color region 202, the color region 204, and the color region 206 in different states. With this configuration, more diverse and high-quality coloring can be performed by using more color regions.

It is also conceivable to increase the number of color regions in the decorative region 156. Furthermore, in FIGS. 2A to 4B, as an example of the configuration of the decorative region 156, the configuration when the clear region 212 is formed between the plurality of color regions is shown. In this case, it can be considered that the plurality of color regions is overlapped so as to sandwich the non-colored region in between. Moreover, in a further modified example of the configuration of the decorative region 156, it is conceivable not to form the clear region 212 between the plurality of color regions. In this case, it can be considered that the plurality of color regions is continuously overlapped.

Furthermore, as described above, in the modified example of the configuration of the shaped object 50, it is conceivable to make the part of the shaped object 50 corresponding to the bulk region 152 hollow. In this case, in the shaped object 50, it is conceivable to form a cavity 164 on the inner side of the decorative region 156 including a plurality of color regions, as in the modified example shown in FIG. 4B. Furthermore, in this case, as shown in FIG. 4B, it is conceivable to dispose the light source 402 inside the cavity 164. More specifically, in the shaped object 50 of the present modified example, the part corresponding to the bulk region 152 in the shaped object 50 having the configuration shown in FIG. 2A is a cavity 164, and a transmission region 162 is provided in place of the light reflecting region 154 in the shaped object 50 having the configuration shown in FIG. 2B. In this case, the transmission region 162 is a translucent region that transmits the light generated by the light source 402 disposed inside the shaped object 50 toward the decorative region 156. As the transmission region 162, it is conceivable to use at least one of clear ink and white ink, or a mixture thereof, to form a region through which the light from the light source 402 is transmitted or transmitted while diffusing. In this case, it is conceivable to form the plurality of color regions in the decorative region 156 so that the light generated by the light source 402 installed in the cavity 164 is transmitted to the outside of the shaped object 50. Furthermore, as the light source 402, a white LED or the like can be suitably used.

In a case of the configuration described above, the image (decorative image) drawn in the decorative region 156 can be seen from outside the shaped object 50 when the light generated by the light source 402 in the cavity 164 is transmitted through the transmission region 162 and the light reflecting region 154. Thus, the design represented in the decorative region 156 can be appropriately visually recognized even in a dark room or outdoors at night. Furthermore, in this case as well, coloring with high designability can be appropriately performed by forming the decorative region 156 including a plurality of color regions.

In addition, in the description made above, an example of a case where a stereoscopic shaped object 50 is manufactured (shaped) as a colored product has been mainly described. In this case, the shaping device 10 (see FIGS. 1A and 1B) that shapes the shaped object 50 can be considered as an example of a device that executes the manufacturing of the colored product. Furthermore, the shaped object 50 manufactured by the shaping device 10 can be considered as a three-dimensional (3D) product or the like. Moreover, in a modified example of the operation of the shaping device 10, it is conceivable to form the shaped object 50 on a flat medium (media). In this case, the configuration combining the medium and the shaped object 50 can be considered as an example of the colored product. Furthermore, in this case, the colored product to be manufactured can be considered as a 2.5-dimensional (2.5D) product or the like.

Furthermore, as the colored product, it is conceivable to manufacture a product other than the stereoscopic shaped object 50. In this case, as the colored product, it is conceivable to manufacture (create) a printed matter obtained by performing printing on a medium.

Figure 5:
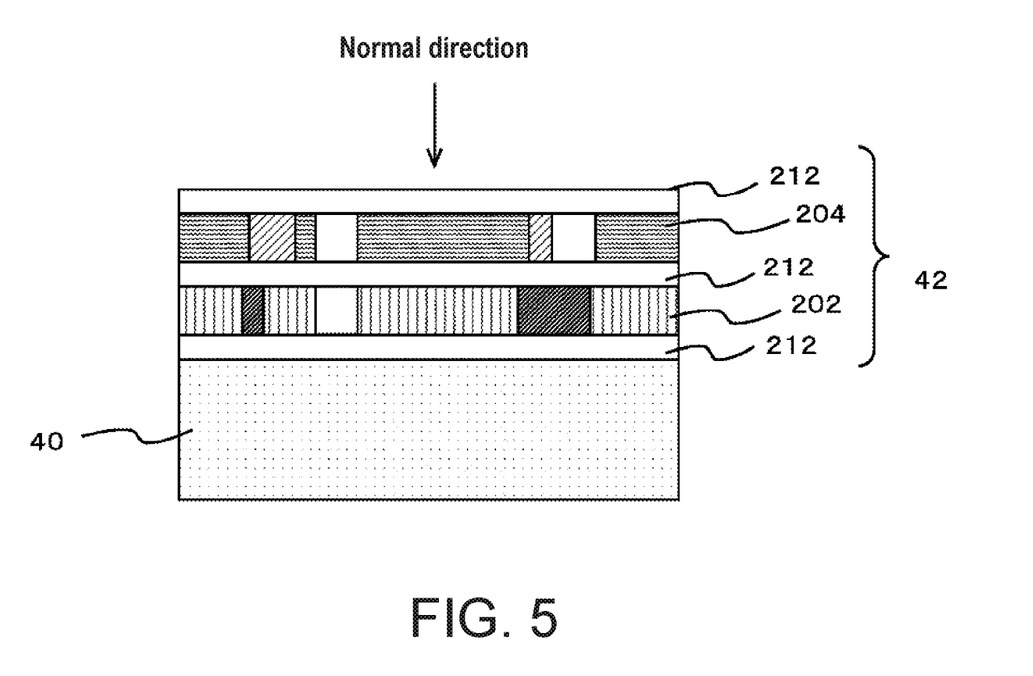
FIG. 5 is a view showing an example of the configuration of a modified example of a colored product.

Furthermore, in this case, the printed matter to be created can be considered as a two-dimensional (2D) product created by forming a layer of ink on the medium. More specifically, as such a colored product, it is conceivable to create a printed matter having the configuration shown in FIG. 5. FIG. 5 is a view showing an example of the configuration of a modified example of the colored product. In this case, the printed matter is created by forming a layered ink layer 42 in which a plurality of layers of ink are overlapped on the medium 40. As the medium 40, a known medium for printing or the like can be suitably used. Furthermore, the layered ink layer 42 may be formed by performing printing with an inkjet printer so as to overlap a plurality of layers of ink.

Furthermore, in this case, the layered ink layer 42 is formed on the medium 40 using an inkjet printer including a plurality of inkjet heads same as or similar to the inkjet heads 102y to k and the inkjet heads 102t in the shaping device 10 described with reference to FIGS. 1A and 1B and the like. As the layered ink layer 42, a plurality of layers of ink having a color region 202, a color region 204, and a plurality of clear regions 212 are formed. In this case, it is conceivable to form the color region 202, the color region 204, and the plurality of clear regions 212 so as to overlap each other in the normal direction, similar to the case of the color region 202, the color region 204, and the clear region 212 in the decorative region 156 of the shaped object 50. Furthermore, in this case, the normal direction can be considered as the normal direction of the printed matter or the like. In addition, the normal direction of the printed matter can be considered as the normal direction on the surface of the layered ink layer 42 formed on the medium 40.

In this case as well, the color region 202 can be considered as an example of the inner colored region. Furthermore, the color region 204 can be considered as an example of the surface side colored region. Moreover, in this case as well, when the color region 202 and the color region 204 are formed, the color ink and the clear ink are used, and the difference in the amount of the color ink used is compensated by the clear ink to appropriately manufacture a printed matter colored in high quality.

Here, as described above, when the stereoscopic shaped object 50 is shaped, the normal direction of the surface of the shaped object 50 is a direction that changes depending on the position of the shaped object 50. As a result, the overlapping of a plurality of regions in the decorative region 156 can be considered as overlapping of regions in a sense different from the overlapping of layers of ink in the layering direction. On the other hand, when creating a printed matter, it can be considered that the normal direction on the surface of the printed matter is parallel to the layering direction in which the layers of ink are layered. Therefore, when a printed matter is created as a colored product, it is conceivable to form each of the color region 202, the color region 204, and the plurality of clear regions 212 as layers of ink to be layered.

Furthermore, in this case, the color region 202 can be considered as a region formed by layers of ink formed on the medium 40. In this case, forming the color region 202 on the medium 40 is not limited to a case where the color region 202 is formed directly on the medium 40 and, as shown in the figure, it can be considered to include forming the color region 202 on the medium 40 by way of another layer of ink (clear region 212). Furthermore, it is conceivable to form the color region 202 on the medium 40 by using at least one of the inkjet heads 102y to k, and the inkjet head corresponding to the inkjet head 102t.

Furthermore, the color region 204 can be considered as a region formed by layers of ink further formed on the color region 202. In this case, forming the color region 204 further on the color region 202 is not limited to a case where the color region 204 is formed directly on the color region 202 and as shown in the figure, it can be considered to include forming the color region 204 on the color region 202 by way of another layer of ink (clear region 212). Furthermore, it is conceivable to form the color region 204 on the color region 202 by using at least an inkjet head corresponding to any of the inkjet heads 102y to k. Moreover, when forming the color region 204, it is preferable to form a layer of ink by further using an inkjet head corresponding to the inkjet head 102t. With this configuration, a layered ink layer 42 including a plurality of color regions can be appropriately formed on the medium 40.

Furthermore, in this case, the inkjet printer used for creating the printed matter can be considered as an example of a printing device for printing a two-dimensional image. Moreover, when using an inkjet printer as well, it is conceivable to shape a stereoscopic shaped object on a medium as a colored product. In this case, it can be considered that the inkjet printer is manufacturing a 2.5-dimensional (2.5D) product by a printing operation.

INDUSTRIAL APPLICABILITY

The present disclosure can be suitably used in a manufacturing method for a colored product.

What is claimed is:

1. A manufacturing method for a colored product which is a product colored using ink, the manufacturing method comprising:
   using a plurality of color ink heads which are a plurality of inkjet heads that eject color inks different from each other;
   using a colorless ink head, which is an inkjet head that ejects colorless ink;
   forming a plurality of coloring regions in an overlapping manner in a normal direction so that a thickness in the normal direction of a surface of the colored product each becomes a predetermined thickness;
   forming, among the plurality of coloring regions, a surface side colored region, which is a region located closest to the surface of the colored product in the normal direction using at least the color ink ejected from any of the color ink heads; and
   forming, among the plurality of coloring regions, an inner colored region, which is a region located farther from the surface of the colored product than the surface side colored region in the normal direction using at least the color ink ejected from any of the color ink heads and the colorless ink ejected from the colorless ink head,
   wherein
   the colorless ink is a colorless and transparent clear ink, and
   a colorless and transparent clear region, which is a region formed with the colorless and transparent clear ink, is further formed between the inner colored region and the surface side colored region in the normal direction.

2. The manufacturing method for the colored product according to claim 1, wherein
the inner colored region is formed using the color inks of a plurality of colors ejected from the plurality of color ink heads, and the colorless ink ejected from the colorless ink head, and is colored with different colors depending on the position by differing an amount of each of the color inks of the plurality of colors to use depending on the position with respect to at least any of the plurality of positions, and
a difference in an amount of color ink used at each position in the inner colored region is compensated by the colorless ink.

3. The manufacturing method for the colored product according to claim 1, wherein
the surface side colored region is also formed by further using the colorless ink ejected from the colorless ink head.

4. The manufacturing method for the colored product according to claim 1, wherein
the colored product is a stereoscopic shaped object,
a light reflecting ink head, which is an inkjet head that ejects light reflecting ink is further used, and
a light reflecting region is further formed on an inner side of the inner colored region in the normal direction by using the light reflecting ink ejected from the light reflecting ink head.

5. The manufacturing method for the colored product according to claim 4, wherein
the inner colored region is colored with a color that matches the color of the inside of an object indicated by the stereoscopic shaped object to be shaped, and
the surface side colored region is colored with a color that more closely matches the color of a part on an outer side of the object than the color of the inside of the object.

6. The manufacturing method for the colored product according to claim 4, wherein
the surface side colored region is colored so as to represent an object that appears on a part of the surface of the object in the object indicated by the stereoscopic shaped object to be shaped, and
the inner colored region is colored so as to represent the object in a state excluding an object appearing on a part of the surface.

7. The manufacturing method for the colored product according to claim 1, wherein
the colored product is a stereoscopic shaped object in which a cavity is formed on an inner side of the plurality of coloring regions, and
the plurality of coloring regions transmit light generated by a light source installed in the cavity to an outside of the stereoscopic shaped object.

8. The manufacturing method for the colored product according to claim 1, wherein
the colored product is a product created by forming a layer of ink on a medium,
the inner colored region formed by a layer of ink is formed by forming the layer of ink on the medium using at least one of the color ink heads and the colorless ink head, and
the surface side colored region formed by a layer of ink is formed by further forming a layer of ink on the inner colored region using at least any of the color ink heads.

9. The manufacturing method for the colored product according to claim 1, wherein
a plurality of the inner colored regions is formed in an overlapping manner in the normal direction, each of the inner colored regions being colored in different states.

* * * * *